United States Patent
Garza et al.

(10) Patent No.: US 10,630,771 B1
(45) Date of Patent: Apr. 21, 2020

(54) CONTENT DELIVERY NETWORK WITH NETWORK STORAGE AND SUPPORT FOR ON-DEMAND CONTENT UPLOAD

(71) Applicant: Akamai Technologies, Inc., Cambridge, MA (US)

(72) Inventors: Javier Garza, Foster City, CA (US); Philip A. Lisiecki, Santa Barbara, CA (US); Michael Haag, Malden, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 819 days.

(21) Appl. No.: 14/835,542

(22) Filed: Aug. 25, 2015

Related U.S. Application Data (63) Continuation of application No. 14/632,720, filed on Feb. 26, 2015.

(51) Int. Cl.
    *G06F 15/16* (2006.01)
    *H04L 29/08* (2006.01)

(52) U.S. Cl.
    CPC ...... *H04L 67/1095* (2013.01); *H04L 67/1097* (2013.01); *H04L 67/2842* (2013.01)

(58) Field of Classification Search
    CPC ................ H04L 67/1095; H04L 67/2842
    See application file for complete search history.

(56) References Cited

U.S. PATENT DOCUMENTS

| | | | |
|---|---|---|---|
| 6,108,703 A | 8/2000 | Leighton et al. | |
| 7,133,905 B2 | 11/2006 | Dilley et al. | |
| 7,136,922 B2 | 11/2006 | Sundaram et al. | |
| 7,143,170 B2 | 11/2006 | Swildens | |
| 7,240,100 B1 | 7/2007 | Wein et al. | |
| 7,296,082 B2 | 11/2007 | Leighton et al. | |

(Continued)

FOREIGN PATENT DOCUMENTS

WO     01/13578     8/2000

OTHER PUBLICATIONS

Aspera Client 3.3.4, User Guide, Document Version v.1, Nov. 1, 2013, available at http://download.asperasoft.com/download/docs/client/3.3.4/linux/pdf/AsperaClient_3.3.4_Linux_UserGuide.pdf, 81 pages.

(Continued)

*Primary Examiner* — Hua Fan (57) ABSTRACT

According to certain non-limiting embodiments disclosed herein, the functionality of a distributed computing platform, such as a content delivery network with network storage, is improved by providing automated and on-demand upload capability into the network storage. In one embodiment, the platform is made up of many proxy servers. As clients request content from the proxies, they generate upload commands for the network storage subsystem to ingest the content from a content provider origin infrastructure. Preferably, the proxy servers are configured to generate 'safe' upload commands such that objects are not ingested if they contain sensitive information and/or are personalized and/or might be dynamically generated objects. Thus, relatively safe 'static' objects can be automatically uploaded and migrated from a content provider origin, as client requests arrive.

19 Claims, 7 Drawing Sheets

(56) References Cited

U.S. PATENT DOCUMENTS

| | | | |
|---|---|---|---|
| 7,340,505 B2* | 3/2008 | Lisiecki | G06F 17/3089 370/227 |
| 7,376,716 B2 | 5/2008 | Dilley et al. | |
| 7,406,512 B2 | 7/2008 | Swildens | |
| 7,472,178 B2 | 12/2008 | Lisiecki et al. | |
| 7,596,619 B2 | 9/2009 | Leighton et al. | |
| 7,642,178 B2 | 1/2010 | Lisiecki et al. | |
| 7,930,402 B2 | 4/2011 | Swildens | |
| 7,945,655 B2 | 5/2011 | Lisiecki et al. | |
| 8,250,211 B2 | 8/2012 | Swildens et al. | |
| 8,447,842 B2 | 5/2013 | Lisiecki et al. | |
| 8,816,082 B2 | 8/2014 | Tsantrizos et al. | |
| 9,009,270 B2 | 4/2015 | Lisiecki et al. | |
| 9,729,605 B2 | 8/2017 | Gero et al. | |
| 2002/0087797 A1 | 7/2002 | Adrangi | |
| 2007/0174463 A1 | 7/2007 | Seed et al. | |
| 2010/0125649 A1 | 5/2010 | Day | |
| 2011/0173345 A1 | 7/2011 | Knox et al. | |
| 2011/0185041 A1* | 7/2011 | Hunt | H04L 65/1069 709/219 |
| 2012/0265853 A1 | 10/2012 | Knox et al. | |
| 2013/0111004 A1 | 5/2013 | Mutton | |
| 2014/0149506 A1 | 5/2014 | Yuan | |

OTHER PUBLICATIONS

Akamai Technologies, Inc., NetStorage Product Brief, Mar. 2014, 2 pages.

Bitnami, Import Your AWS Server to Bitnami Cloud Hosting, 2web page, available at https://bitnami.com/cloud/get-started, downloaded Feb. 25, 2015, 3 pages.

Akamai Technologies, Inc., NetStorage Product Brief, Jun. 2014, 2 pages.

GNU Wget 1.16.1 manual, Nov. 11, 2014, Hrvoje Niksic et al., copyright 1996-2011 Free Sofware Foundation, 71 pages.

GNU Wget 1.16.2 manual, Jan. 31, 2015, Hrvoje Niksic et al., copyright 1996-2011 Free Sofware Foundation, 71 pages.

Wikipedia, Wget, published Jan. 12, 2015, available at httpps://en.wikipedia.org/w/index.php?title=Wget&oldid=642175462, downloaded Aug. 20, 2015.

Order For Supplies or Services between US NRC and Akamai Technologies, Contract No. GS35FU626M, accession No. ML13364A102, dated Dec. 17, 2013, document released publicly Jan. 7, 2014, pricing redacted, available at http://adams.nrc.gov/wba/, 38 pages, please see Statement of Work Task 1-2, pp. 19-22 as well as entire document.

Order For Supplies or Services between US Nuclear Regulatory Comm. and Akamai Technologies, Contract No. GS35F0626M, accession No. R275114, requisition date Nov. 29, 2011, pricing redacted, document released publicly Apr. 2012, available at http://adams.nrc.gov/wba/, 45 pages, please see Statement of Work Task 1-2, pp. 5-8 as well as entire document.

Luna Control Center, customer support web page, copyright 2015, 1 page.

Akamao NetStorage User's Guide, Sep. 25, 2014, 102 pages.

Akamai NetStorage User's Guide, Mar. 10, 2014, 92 pages.

Akamai Site Snapshot Tool User Guide, Sep. 6, 2006, 16 pages.

NetStorage HTTP API Specification (For FileStore), Oct. 29, 2014, 32 pages.

NetStorage HTTP API Specification (For ObjectStore), May 5, 2015, 42 pages.

IDS Transmittal Letter Sep. 17, 2015, submitted with this SB/08, requesting treatment of all items abvove as 'prior art', regardless of date.

* cited by examiner

CONTENT DELIVERY NETWORK WITH NETWORK STORAGE AND SUPPORT FOR ON-DEMAND CONTENT UPLOAD

This application is a continuation of U.S. application Ser. No. 14/632,720 filed Feb. 26, 2015, and claims the benefit of priority of that earlier application. The disclosure of U.S. application Ser. No. 14/632,720 is hereby incorporated by reference in its entirety.

This patent document contains material which is subject to copyright protection. The copyright owner has no objection to the facsimile reproduction by anyone of the patent document or the patent disclosure, as it appears in Patent and Trademark Office patent files or records, but otherwise reserves all copyright rights whatsoever.

BACKGROUND

Technical Field

This application relates generally to distributed data processing & storage systems, to the delivery of content to users over computer networks, and to the automated upload of content to content delivery networks and network storage systems.

Brief Description of the Related Art

Distributed computer systems are known in the art. One such distributed computer system is a "content delivery network" or "CDN" that is operated and managed by a service provider. The service provider typically provides the content delivery service on behalf of third parties. A "distributed system" of this type typically refers to a collection of autonomous computers linked by a network or networks, together with the software, systems, protocols and techniques designed to facilitate various services, such as content delivery or the support of outsourced site infrastructure. This infrastructure is shared by multiple tenants, the content providers. The infrastructure is generally used for the storage, caching, or transmission of content—such as web pages, streaming media and applications—on behalf of such content providers or other tenants. The platform may also provide ancillary technologies used therewith including, without limitation, DNS query handling, provisioning, data monitoring and reporting, content targeting, personalization, and business intelligence.

Figure 1:
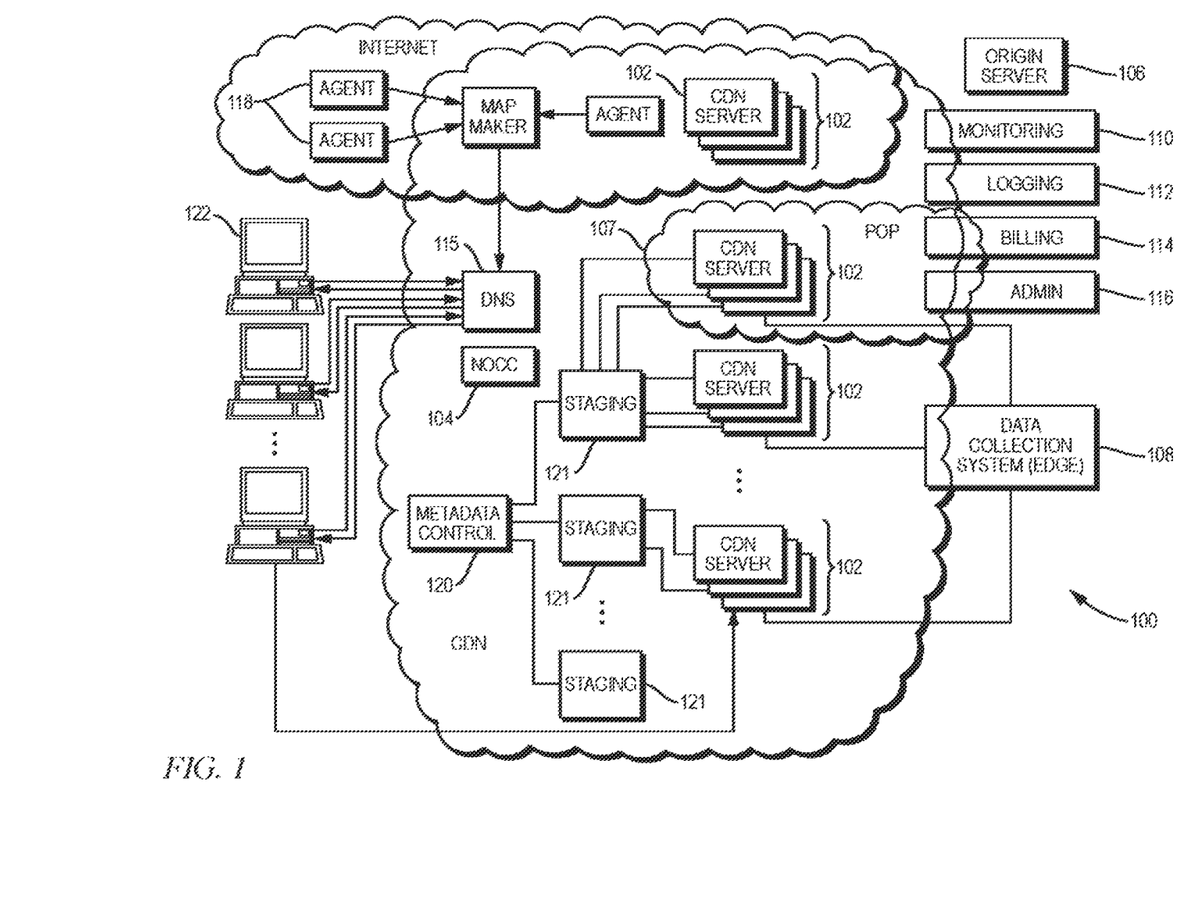
FIG. 1 is a schematic diagram illustrating an embodiment of a known distributed computer system configured as a content delivery network.

In a known system such as that shown in FIG. 1, a distributed computer system 100 is configured as a content delivery network (CDN) and has a set of servers 102 distributed around the Internet. Typically, most of the servers are located near the edge of the Internet, i.e., at or adjacent end user access networks. A network operations command center (NOCC) 104 may be used to administer and manage operations of the various machines in the system. Third party sites affiliated with content providers, such as web site origin server 106, offload delivery of content (e.g., HTML or other markup language files, embedded page objects, streaming media, software downloads, and the like) to the distributed computer system 100 and, in particular, to the CDN servers (which are sometimes referred to as content servers, or sometimes as "edge" servers if they are deployed near an "edge" of the Internet). Such servers may be grouped together into a point of presence (POP) 107 at a particular geographic location.

Typically, content providers offload their content delivery by aliasing (e.g., by a DNS CNAME) given content provider domains or sub-domains to domains that are managed by the service provider's authoritative domain name service. The server provider's domain name service directs end user client devices 122 that desire content to the distributed computer system (or more particularly, to one of the CDN servers in the platform) to obtain the content more reliably and efficiently. The CDN servers respond to the client requests, typically by fetching requested content from a local cache, from another CDN server, from the origin server 106 associated with the content provider, or other source, and sending it to the requesting client.

For cacheable content, CDN servers typically employ on a caching model that relies on setting a time-to-live (TTL) for each cacheable object. After it is fetched, the object may be stored locally at a given CDN server until the TTL expires, at which time is typically re-validated or refreshed from the origin server 106. For non-cacheable objects (sometimes referred to as 'dynamic' content), the CDN server typically returns to the origin server 106 time when the object is requested by a client. The CDN may operate a server cache hierarchy to provide intermediate caching of customer content in various CDN servers that are between the CDN server handling a client request and the origin server 106; one such cache hierarchy subsystem is described in U.S. Pat. No. 7,376,716, the disclosure of which is incorporated herein by reference.

Although not shown in detail in FIG. 1, the distributed computer system may also include other infrastructure, such as a distributed data collection system 108 that collects usage and other data from the CDN servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115. A distributed data transport mechanism 120 may be used to distribute control information (e.g., control metadata to manage content, to facilitate load balancing, and the like) to the CDN servers.

The CDN may include or be associated with a network storage subsystem (sometimes referred to herein as "NetStorage" or cloud storage) which may be located in a network datacenter accessible to the CDN servers and which may act as a source of content, such as described in U.S. Pat. No. 7,472,178, the disclosure of which is incorporated herein by reference. The network storage subsystem enables a content provider to manually upload content objects to the storage platform, from which they can be retrieved and delivered via the content delivery platform. The network storage subsystem may shard and replicate uploaded objects across multiple storage PoPs, and in general offer a robust outsourced storage platform for content management.

Figure 2:
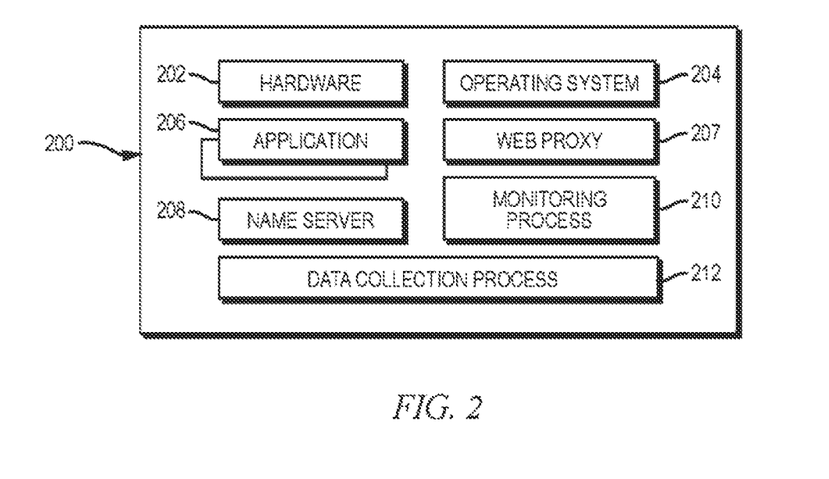
FIG. 2 is a schematic diagram illustrating an embodiment of a machine on which a content delivery server in the system of FIG. 1 can be implemented.

As illustrated in FIG. 2, a given machine 200 in the CDN comprises commodity hardware (e.g., a microprocessor) 202 running an operating system kernel (such as Linux® or variant) 204 that supports one or more applications 206. To facilitate content delivery services, for example, given machines typically run a set of applications, such as an HTTP proxy 207, a name service 208, a local monitoring process 210, a distributed data collection process 212, and the like. The HTTP proxy 207 typically includes a manager process for managing a cache and delivery of content from the machine. For streaming media, the machine may include one or more media servers, such as a Flash server, as required by the supported media formats. The machine 200 may run a file storage and storage system manager application to provide storage services.

A given CDN server shown in FIG. 1 may be configured to provide one or more extended content delivery features, preferably on a domain-specific, content-provider-specific basis, preferably using configuration files that are distributed to the CDN servers using a configuration system. A given configuration file preferably is XML-based and includes a set of content handling rules and directives that facilitate one or more advanced content handling features. The configuration file may be delivered to the CDN server via the data transport mechanism. U.S. Pat. No. 7,240,100, the contents of which are hereby incorporated by reference, describe a useful infrastructure for delivering and managing CDN server content control information and this and other control information (sometimes referred to as "control metadata") can be provisioned by the CDN service provider itself, or (via an extranet or the like) the content provider customer who operates the origin server. More information about a CDN platform can be found in U.S. Pat. Nos. 6,108,703 and 7,596,619, the teachings of which are hereby incorporated by reference in their entirety.

In a typical operation, a content provider identifies a content provider domain or sub-domain that it desires to have served by the CDN. When a DNS query to the content provider domain or sub-domain is received at the content provider's domain name servers, those servers respond by returning the CDN hostname (e.g., via a canonical name, or CNAME, or other aliasing technique). That network hostname points to the CDN, and that hostname is then resolved through the CDN name service. To that end, the CDN name service returns one or more IP addresses. The requesting client application (e.g., browser) then makes a content request (e.g., via HTTP or HTTPS) to a CDN server machine associated with the IP address. The request includes a host header that includes the original content provider domain or sub-domain. Upon receipt of the request with the host header, the CDN server checks its configuration file to determine whether the content domain or sub-domain requested is actually being handled by the CDN. If so, the CDN server applies its content handling rules and directives for that domain or sub-domain as specified in the configuration. These content handling rules and directives may be located within an XML-based configuration file, as mentioned previously.

CDN server resources may be used to facilitate wide area network (WAN) acceleration services between enterprise data centers and/or between branch-headquarter offices (which may be privately managed), as well as to/from third party software-as-a-service (SaaS) providers used by the enterprise users. In this vein CDN customers may subscribe to a "behind the firewall" managed service product to accelerate Intranet web applications that are hosted behind the customer's enterprise firewall, as well as to accelerate web applications that bridge between their users behind the firewall to an application hosted in the internet cloud (e.g., from a SaaS provider).

For live streaming delivery, the CDN may include a live delivery subsystem, such as described in U.S. Pat. No. 7,296,082, and U.S. Publication Nos. 2011/0173345 and 2012/0265853, the disclosures of which are incorporated herein by reference.

Periodically, a content provider may upload content into the CDN's network storage subsystem to take advantage of offload, fault-tolerance, replication, and delivery optimization it can provide. To a large degree, this may occur when a content provider is first integrating its website or digital content portfolio to the CDN platform, but it may also occur periodically thereafter as content is updated or added. The process of migrating content onto the CDN's storage system can be cumbersome, particularly if the content provider has a large site with many objects. Given the volume of online content and (in some cases) the urgency of integrating a customer that is experiencing origin site problems (such as traffic overload or DoS attack), manual upload of content files is inadequate.

Hence, there is a need for efficient, accurate, and robust technical ways of onboarding content onto CDN platform. The teachings herein improve distributed computing platforms by, among other things, providing technical functionality to facilitate on-demand upload and other upload features described herein. The teachings hereof address the needs identified above and also provide other benefits and improvements that will become apparent in view of this disclosure.

SUMMARY

According to certain non-limiting embodiments disclosed herein, the functionality of a distributed computing platform, such as a content delivery network with network storage, is improved by providing automated and on-demand upload capability into the network storage. In one embodiment, the platform is made up of many proxy servers. As clients request content from the proxies, the proxies can generate upload commands for the network storage network storage to ingest the content from a content provider origin infrastructure. Preferably, the proxy servers are configured to generate 'safe' upload commands such that objects are not ingested if they contain sensitive information and/or are personalized and/or might be dynamically generated objects. Thus, relatively safe 'static' objects can be automatically uploaded and migrated from a content provider origin, as client requests arrive. Alternatively, in some embodiments, network storage can ingest the content from one of the proxies, rather than the content provider origin.

In one embodiment, there is a method for improving the migration of objects to a distributed computing system, the distributed computing system having a plurality of proxy servers deployed across one or more computer networks for delivering content of one or more content providers. The method is preferably performed at a given proxy server and includes receiving a first request for an object from a client device; sending a second request for the object to a network storage system; receiving a first response from the network storage system, the first response indicating that the object was not found in the network storage system; sending a second response to the client device in response to the first request, the second response including the object (e.g., the object typically having been retrieved from an origin server, for example); and generating and sending a message to the network storage system, the message including a URL for the object and identifying an origin server distinct from the network storage subsystem, the message causing the network storage system to retrieve the object from the origin server and store the object in the network storage system. The network storage subsystem may thereafter serve the object as an origin, without regard to its TTL.

The generation of the message is, in many cases, performed asynchronously to the sending of the second response.

In some embodiments, the method further includes retrieving the object from the origin server, in order to be able to send the second response with the object. The given proxy server may have configuration stored that is pertinent to the above operations. The configuration may specify that the network storage system is designated as an origin. It may specify logic that instructs the given proxy server as to whether to generate the message, based at least in part on the first request. It may specify logic that instructs the given proxy server how to generate the message from either the first request or the second request. The message may be generated from the first request or second request, for example, by removing at least one of the following from that request: (i) a request header, (ii) a cookie, (iii) a URL parameter. The configuration may specify logic that instructs the given proxy server as to whether the object is a static object, as part of generating the message.

In another embodiment, there is a method for improving the migration of objects to a distributed computing system, the distributed computing system having a plurality of proxy servers deployed across one or more computer networks for delivering content of one or more content providers, the method performed at a given proxy server. In this embodiment, the method includes receiving a first request for an object from a client device; sending a second request for the object to a network storage subsystem; receiving a first response from the network storage subsystem, the first response indicating that the object was not found in the network storage subsystem; retrieving the object from an origin server distinct from the network storage subsystem; sending the second response to the client device in response to the first request, the second response comprising the object; and generating a message to the network storage subsystem, the message including the object and the message causing the network storage subsystem to store the object.

In another embodiment, there is a method for on-demand ingestion of objects, involving receiving a first request for an object from a client device; sending a second request for the object to the network storage subsystem; receiving a first response from the network storage subsystem, the first response indicating that the object was not found in the network storage subsystem; retrieving the object from an origin server distinct from the network storage subsystem; ending a second response to the client device in response to the first request, the second request comprising the object; in response to the object not being found in the network storage subsystem, retrieving the object from one of the plurality of proxy servers, subsequent to receiving the second request from the particular proxy server; and storing the object in the network storage subsystem.

In another embodiment, there is a method for migrating objects to a distributed computing system, the distributed computing system having a plurality of proxy servers deployed across one or more computer networks for delivering content of one or more content providers and network storage, the method performed at a given proxy server. The method involves receiving a first request for an object from a client device; sending a second request for the object to network storage, the network storage comprising a set of one or more servers; receiving a first response from the network storage, the first response indicating that the object was not found in the network storage; sending a second response to the client device in response to the first request, the second response including the object; generating and sending, as part of the second request, an instruction that causes the network storage to retrieve the object and store the object in the network storage upon the condition that the object is not found in the network storage.

As those skilled in the art will recognize, the foregoing description merely refers to examples of the invention by way of introduction. The claims at the end of this patent document define the scope of protection and may reflect other embodiments not mentioned above, as that is merely an overview. It is not limiting and the teachings hereof may be realized in a variety of systems, methods, apparatus, and non-transitory computer-readable media. It should also be noted that the allocation of functions to particular machines is not limiting, as the functions recited herein may be combined or split amongst different machines in a variety of ways.

BRIEF DESCRIPTION OF THE DRAWINGS

The teachings hereof will be more fully understood from the following detailed description taken in conjunction with the accompanying drawings, in which.

DETAILED DESCRIPTION

The following description sets forth embodiments of the invention to provide an overall understanding of the principles of the structure, function, manufacture, and use of the methods and apparatus disclosed herein. The systems, methods and apparatus described herein and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, publications and references cited herein are expressly incorporated herein by reference in their entirety. Throughout this disclosure, the term "e.g." is used as an abbreviation for the non-limiting phrase "for example." The following description assumes familiarity with conventional hypertext transfer protocol (HTTP) and proxy caching technologies.

Figure 3:
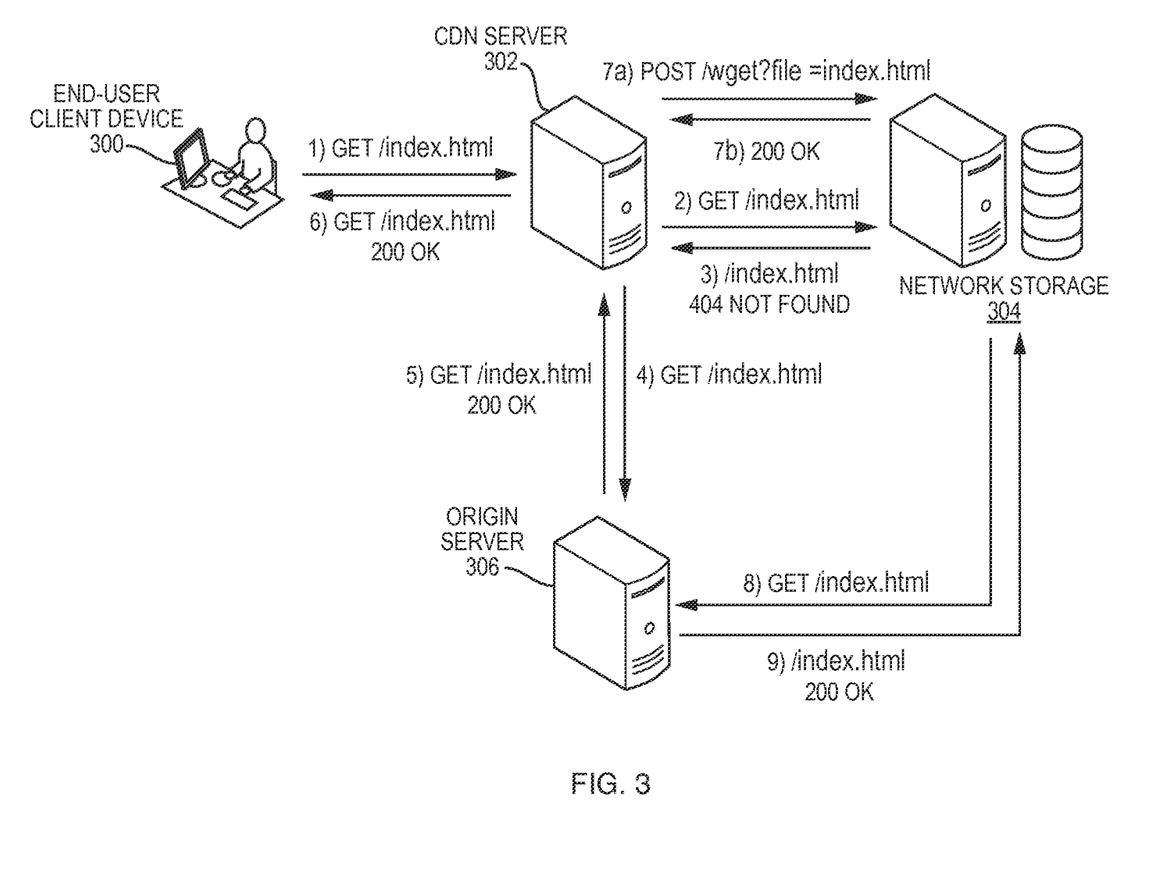
FIG. 3 is a schematic diagram illustrating, in one embodiment, an initial client request for a given object and an example of an on-demand upload workflow in a CDN, in accordance with the teachings hereof.

FIG. 3 illustrates a representative workflow relating to an initial request for a given object, which triggers an on-demand upload to network storage. The representative workflow is illustrated with respect to the components of a content delivery platform such as that described with respect to FIGS. 1-2.

Client device 300 runs a client application such as web browser or Internet-enabled app and is used by end-user to access desired content and services on the Internet. The client device 300 may be a desktop computer, laptop, tablet, smartphone, other wireless device, or otherwise, without limitation.

CDN server 302 is a CDN/content server of the type described with respect to FIGS. 1-2, as modified by the teachings hereof. The CDN server 302 preferably runs an HTTP proxy server application with a local cache and includes a configuration utility that parses content-provider-specific content handling directives (e.g., specified in XML configuration file) to determine the feature-set and handling to apply for a given content request, in the manner described previously with respect to CDN server 102.

Network storage 304 represents a given site that is part of a distributed network storage subsystem, preferably of the type referred to previously as NetStorage and as described in U.S. Pat. No. 7,472,178, the teachings of which are hereby incorporated by reference. As mentioned above, customers of the CDN can put content on the storage subsystem so as to offload their origin infrastructure and take advantage of the increased fault-tolerance and performance that the storage system can provide. Note that in some embodiments, the network storage solution could be distinct platform provided by a third party (not the CDN), such as a vendor to the CDN or to the content provider.

Figure 4:
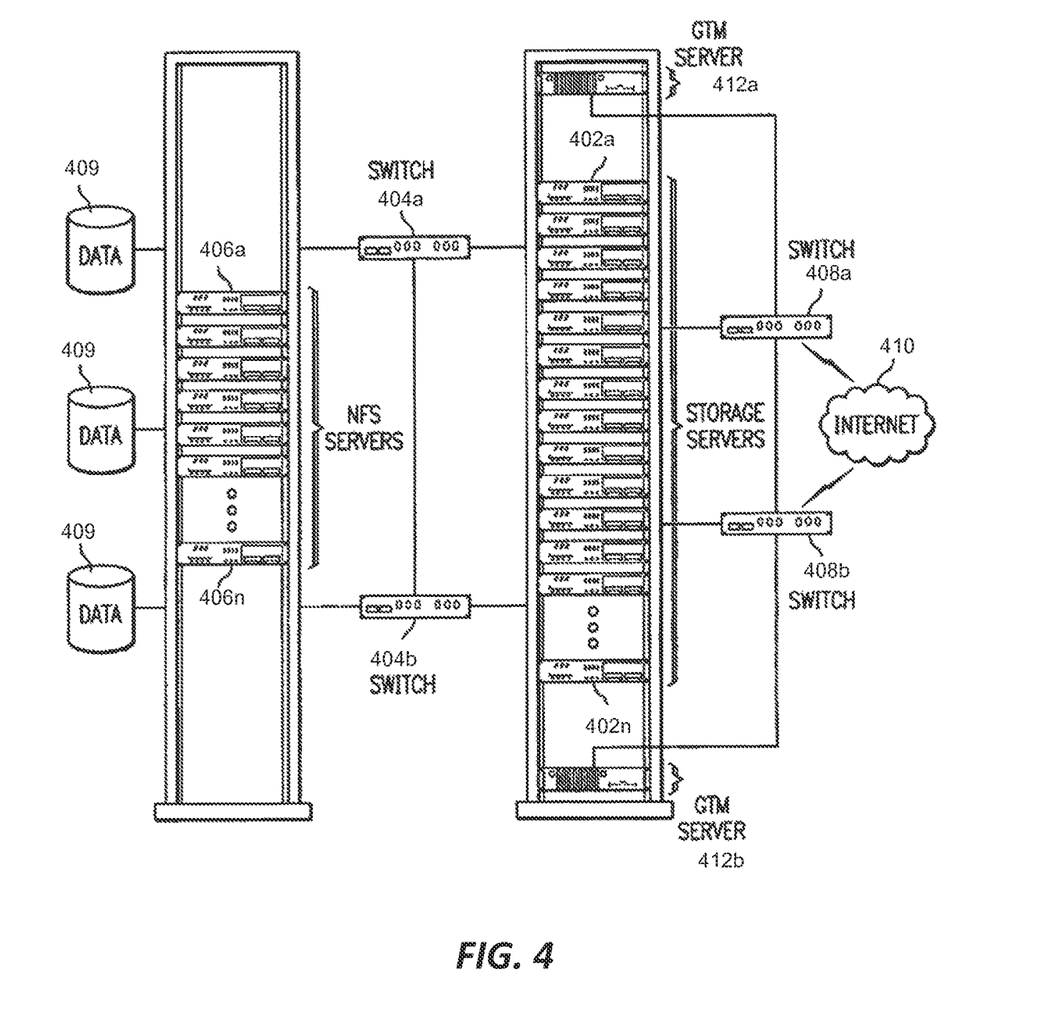
FIG. 4 is a schematic diagram illustrating, in one embodiment, a given site in a network storage subsystem, in accordance with the teachings hereof.

The distributed storage subsystem preferably comprises a set of storage servers distributed across variety of sites (also referred to as PoPs) on the Internet. FIG. 4 illustrates a representative data storage site. Content in the storage can be replicated across different sites, or even across different servers within the site, although neither of these features are a requirement of the methodologies described here. But replication provides fault-tolerance and also increases performance because content can be transmitted to end-users from the replicated site nearest to them and/or with the least congestion (among other things).

As illustrated, a storage site may have a collection of client servers 402a-n that share a back-end switch 404a-b and a set of file servers 406a-n, e.g., NFS servers, which, together with the network filesystem 409, provide raw storage to a set of content upload, download and replication services provided by the client servers 402. The NFS servers export the network filesystem to the client servers. At least some of the client servers execute upload (e.g., more traditional ones like FTP, RSYNC, and newer approaches using HTTP) processes, as well as provide an API interface (e.g., using HTTP) via which clients can initiate upload or other management functions, as will be seen (and note that in this case, the clients may be CDN servers). Further, at least some of the client servers execute download (e.g., HTTP) processes. Preferably, each of the client servers executes a replication engine, which provides overall content management for the storage site and facilitates replication of content from one site to another after upload. Content upload is a service that allows a content provider to upload content to the storage site. Content replication is a service that ensures that content uploaded to a given storage site is replicated to a set of other storage sites (each a "replica" or "replica site") to increase content availability and improve performance. Content download is a service that allows content to be accessed by an entity, e.g., via a CDN server, that makes a given request. Thus, in an illustrative embodiment, a storage site preferably consists of a network filesystem, and a set of NFS servers 406a-n that export the network filesystem to a set of client servers 402.

Note that the file servers 406a-n may be CDN-owned and operated or outsourced. In this example, the servers in the region share a back-end switch 404 and are connected to the Internet 410 via one or more front-end switches 408a-b. Preferably, the NFS servers 106 are attached to the back-end switches 404a-b as illustrated in FIG. 4. A managed storage service preferably has two or more storage sites, each of which may comprise the implementation of FIG. 4. As also seen in FIG. 4, the storage site may also host one or more servers 412a, 412b of a global traffic management (GTM) system. GTM products and services are known in the art and are useful to determine which of a set of mirrored machines should be used for obtaining given content. The CDN may use a given GTM product or managed service to determine which storage site receives the content when it is initially uploaded to the storage system, and which storage site should be used as the target of a request for the content by a given entity such as a CDN server.

In another alternate embodiment, the network storage subsystem is composed of a directory services layer and an object storage layer. The directory services layer may be distinct and deployed independently of the network storage layer. In this embodiment, the directory services layer is preferably a replicated, no-SQL database that translates end-user names for objects to the names used by the object store on the back-end, and also provides storage and retrieval of metadata such as file size and headers for the objects. The directory service layer in effect hides the complexity of the file system of the storage system (which for example may not be NFS) from the clients, and provides the illusion of a single name for a single object in the storage system. A client (e.g., a CDN server) contacts the directory services layer to get an object, and (assuming the object is stored in the system) receives the object metadata and a mapping with a name(s) that can be used to obtain the object from the object storage layer. The object storage layer provides a front-end with a download server and upload server (essentially corresponding in functionality to the client servers 402 mentioned above), and a back-end with the actual data storage servers.

The foregoing are merely some embodiments provided for illustration. The teachings hereof are not limited to any particular architecture, configuration, or arrangement for the network storage subsystem 304.

Returning to FIG. 3, origin server 306 hosts content—such as web site objects, streaming media objects, and the like—for distribution to end users. Assume the origin server 306 is associated with a content provider who desires to use the CDN platform to distribute such content to end users. To do this, it is often desired to move (that is upload) certain content previously on the origin infrastructure to the CDN's network storage subsystem, which will thereafter serve as an origin for that content. Preferably this is content that is not dynamically generated, e.g., not generated with reference to back-end databases or applications in the origin infrastructure. Streaming media objects (such as videos) are typical candidates. In the past, such content was manually-uploaded either individually or in batches to the CDN using an upload protocol (e.g., FTP, RSYNC) as part of the on-boarding process.

With reference to FIG. 3, an automated process for uploading content to the CDN network storage subsystem 304 is now described. FIG. 3 illustrates the initial client request for an object that is not present in the CDN's network storage 304. The initial client request for this object triggers a special workflow that will populate the object into CDN network storage 304. The object is typically uploaded to a given site, and then may then be replicated across sites as mentioned earlier, per known replication techniques. In this way, as client requests are received for various objects on the origin server 306, the origin server's content is gradually migrated to the CDN network storage 304. The technique preferably distinguishes between objects that should be stored in the network storage system versus those (such as personalized dynamic content) that should not. This will be described below.

At step 1, the client device 300 sends a content request to the CDN server 302, illustrated here as a HTTP GET for an HTML document named 'index.html' on a content provider domain www.example.com, which has been aliased to the CDN. The CDN server 302 binds the request to a configuration file specifying content handling directives ("control metadata") for this content provider and this object. Since this is the initial request for the object, it will not be in local cache of the server 302, and is fetched from an origin. The configuration specifies that the origin is the CDN network storage 304. At step 2, the server 302 therefore generates a forward request to the network storage 304. The network storage receives this forward request, but the object is not present, so it sends a 'not found' HTTP 404 message, shown at step 3.

The configuration file at the CDN server 302 specifies failover logic when the requested object is not present in network storage 304. In this embodiment, the failover consists of the following actions: (a) fetch the object from an alternate source (e.g., the content provider's origin server 306) and return it to the end user; (b) initiate a content ingest routine to get the object onto network storage 304. Action (a) is illustrated with steps 4, 5, 6 in FIG. 3, in which the server 302 sends a HTTP GET for the object to the content provider origin server 306, receives an HTTP 200 OK response and the object, and sends it to the end-user client device 300 in response to the client's original request. Action (b) is illustrated with steps 7-9 in FIG. 3. Preferably, steps 7-9 are performed asynchronously to action (a), so as to avoid a performance impact on serving the object to the end user.

In step 7a, the server 302 generates a request instructing the cloud storage 304 to pull the object from the origin server and save it locally. This request is preferably constructed to ensure that sensitive information, such as personally identifiable information (PII) and/or dynamically generated content (and/or any content designated as 'nostore') is not stored in the network storage subsystem 304. In this embodiment, the request is an HTTP POST request message to an API provided by the network storage 304. The POST request message specifies a fetching service targeting the requested object. Although not shown, a POST header can be used to designate the name of the origin server (e.g., origin server 306) from which the object should be retrieved, as well as other information about the operation and/or that should be stored with the object. The teaching service can be provided by an application such as 'wget' which is for retrieving files using HTTP/S or FTP and is merely one implementation example. The 'wget' can be part of the API provided by the client server 402 and/or management API of the object store front-end in the network storage subsystem that was previously described, for example. Note that the 'wget' application is merely provided as an example of a web content retrieval utility, and that any such utility could be used.

In step 7b, the network storage 304 returns a HTTP 200 OK to the server 302 to indicate that the request was received and will be performed. If unsuccessful, an error code could be returned. In response, the server 302 might retry the content ingest with the same or different network storage site, or take other remedial action, or do nothing. Note that an additional acknowledgement can be sent after the operation is completed to tell the CDN server 302 that the ingest operation was successful, or the HTTP 200 ok could be delayed until that time.

The fetching service may queue multiple such object retrieval requests. At some point, shown at step 8, the fetching service at the network storage 304 requests the object from the origin server 306, and in step 9 the origin server 306 returns the object with HTTP 200 OK status code. The network storage 304 then stores the object indefinitely—that is, because the network storage is acting as an origin and not a cache, the network storage does not consult the TTL of the object to determine its freshness before serving it in response to later requests. After upload is complete, the object may be replicated across storage sites 304, as described previously.

Figure 5:
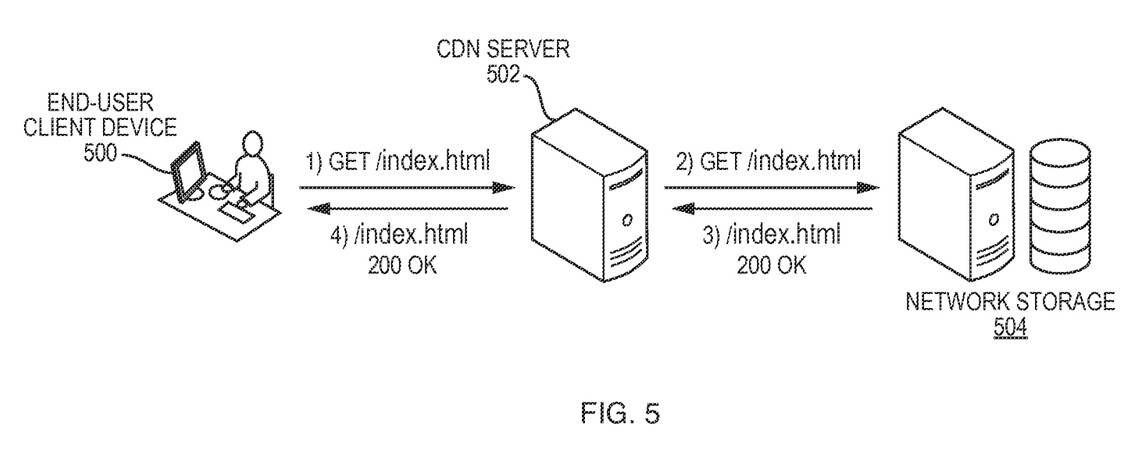
FIG. 5 is a schematic diagram illustrating, in one embodiment, a subsequent client request for the given object shown in FIG. 3, after the on-demand upload process illustrated in FIG. 3.

FIG. 5 illustrates a representative workflow in which the same object as in FIG. 3 is subsequently requested, e.g., by the same or another client device. The server 502 may be the same server 302 as in the initial workflow, or a different server 502 in the CDN platform. Referring to FIG. 5, in step 1 the client device 500 generates an HTTP GET for the object 'index.html' to the server 502. In step 2, the server 502 checks local cache. Assume that there is a cache miss. (The server 502 may be the same as server 302 but the object TTL has expired, for example. Or, server 502 may be a different server than server 302 and hence never have encountered the object before.)

At step 2, the server 502 is configured to generate a forward request to network storage 504, the same forward request action as in step 2 of FIG. 3. This time, the network storage 504 has the object. (Note, for completeness, that the network storage 504 site that the server 502 is communicating with might be the same network storage site that the object was originally uploaded to in FIG. 3, or a different site to which the object was replicated after the FIG. 3 process.) In step 3, network storage 504 returns the object to the server 502 with a 200 OK, and in step 4 the server 502 returns the object to the client device 500. The server 502 may cache the object locally for use in responding to subsequent requests, in accordance with its TTL.

Note that in some operations, upon a cache miss, the server 502 may simply validate the object with the network storage site 504 using an if-modified-since request, which avoids the need to transfer the object if it has not changed. Generalizing, after a given object is loaded into network storage, preferably the network storage acts as in the role of a conventional origin to the server; hence any caching or object revalidation semantic between a caching proxy and origin is available.

Figure 6:
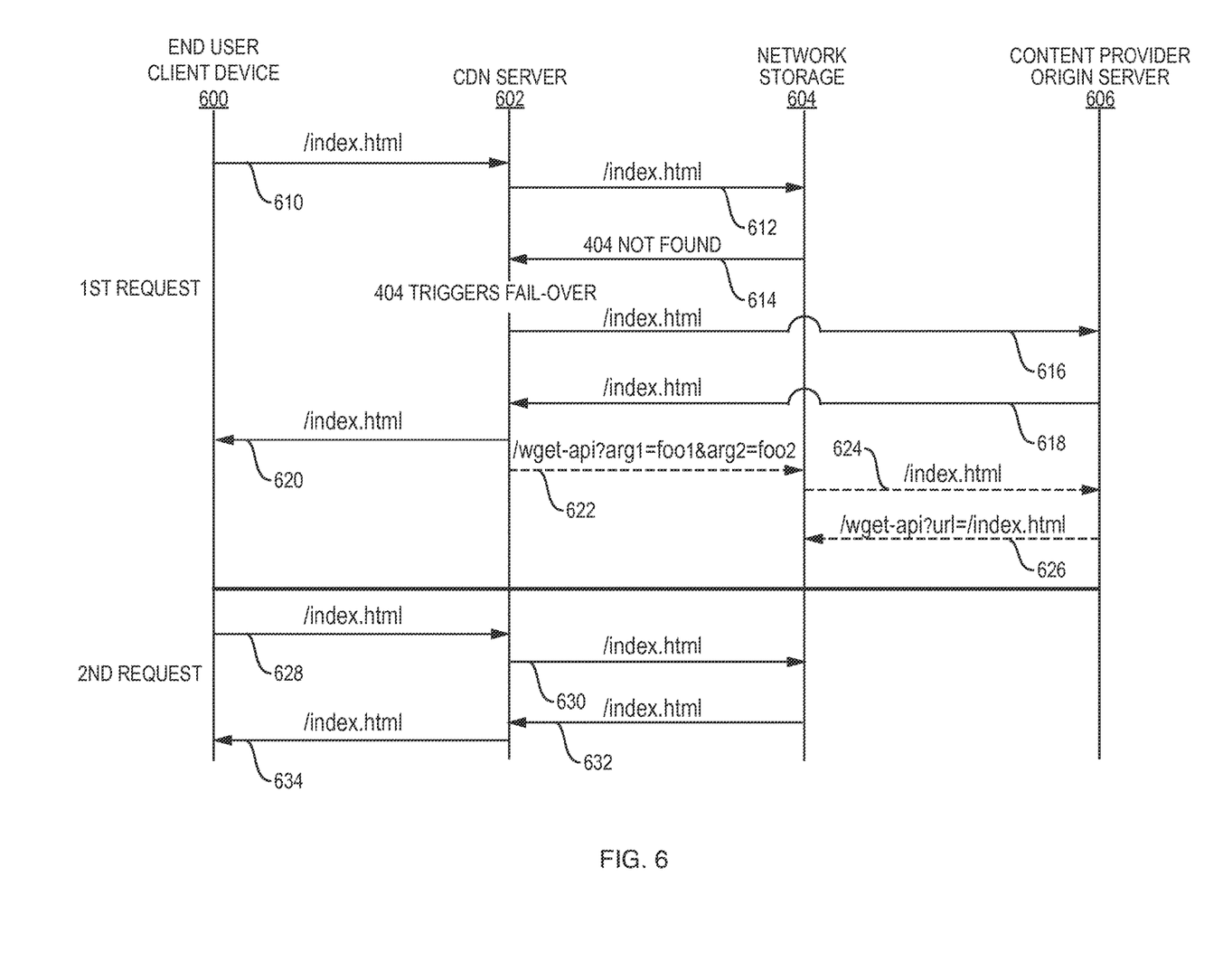
FIG. 6 is a diagram illustrating, in one embodiment, an example of a sequence of messages in the on-demand upload workflow shown in FIG. 3, in accordance with the teachings hereof; and, FIG. 7 is a block diagram illustrating hardware in a computer system that may be used to implement the teachings hereof.

FIG. 6 is a diagram illustrating the sequence of messages in the on-demand upload workflow that was shown in FIG. 3. Two scenarios are illustrated: the initial request for the 'index.html' object triggering the on-demand upload process, and a subsequent request for that same object. The first scenario begins at 610 with the end user client device 600 sending an HTTP GET request for index.html on hostname 'www.example.com' to a given CDN server 602. At 612, the server 602 generates a forward request for the object to a selected network storage site 604, but the network storage site 604 returns an HTTP 404 code as the object is not yet stored there (614). The server's receipt of the 404 triggers the failover which causes the server 602 to retrieve the object from the content provider origin 606 at steps 616, 618. At 620, the server 602 returns the object to the client 600; the server 602 may cache the object according to its cache control headers (including TTL) for serving to subsequent clients. The server 602 then initiates the process of uploading the content onto the cloud storage site 604 by generating an instruction to the appropriate cloud storage API at 622 to ingest the content that was just needed. The 'arg1=foo1&arg2=foo2 . . . ' is meant to illustrate that a variety of arguments may be passed to the API, such as the origin hostname, pathname, authentication headers to use, etc. (these will be explained in more detail below). At 624 and 626, network storage requests and receives the object form the origin.

Note that in alternate embodiments, network storage 604 could request the object from a CDN, and in some cases even the CDN server 602 from which it had received the initial request, as that CDN server would presumably have it in cache. For this, the network storage 604 might issue the request to the server 602 after getting the message at 622, or might be configured to issue the request to the server 602 after some time period following the object miss at 614. This can be advantageous to reduce load on the origin. In another embodiment, the CDN server 602 might send (that is, include it in payload) the object to network storage 604 with the ingest instruction at 622.

The second request for the object begins at 628, when the client device 600 makes a request for the object. The server 602 (assuming a cache miss) generates a forward request to network storage 604 (step 630). Now the network storage subsystem 604 has the object, so it is returned at 632 and the server 602 returns the object to the client device 600 at 634.

In the embodiment described above, when the CDN server sends the ingest instruction to network storage (or more particularly to a given network storage server at a given site) to upload the object, it constructs a target universal resource locator (URL) at which the network storage should fetch the object. Preferably, the CDN server can construct this request in a custom fashion to include or exclude headers, cookies, URL parameters, or portions thereof, or other information present in the original request from the client device. This is advantageous because it can be tailored to avoid ingesting personalized and/or dynamically generated content. Preferably, the CDN server can construct the URL so that the upload targets static content suitable for upload into the CDN's network storage. In some cases, the stripped-down URL may result in an error form the origin because the URL is targeting personalized content (for example); this is generally preferable though to ingesting such content. In addition, in some embodiments, the CDN server adds static headers (for example for authentication purposes with the cloud storage solution, or to enable the network storage solution to authenticate with content provider origin). The CDN server configuration may specify how to construct the ingest instruction from either the original request or the forward request to the network storage system, e.g., by specifying cookies or other aspects to be stripped.

In a broader sense, the CDN server can consult any configuration file with control metadata that is present at the CDN server for handling content of the given content provider. This enables the ingest function to be controlled and configured with the same level of specificity and flexibility that the configuration file/control metadata solution provides for handling objects already on the CDN. A content provider can designate for example, specific classes or types of objects that are to be ingested, while others are not. Furthermore, the control metadata can be used to specify that an object is to be ingested only under certain circumstances (e.g., after a certain number of requests have occurred, at certain times, or the like). For example, the control metadata may specify a priority for each object, indicating which objects are more or less important. With such a setting, the storage service can, when the number of objects to be fetched (i.e. in the fetching service queue) exceeds some system limit (such as bandwidth, connection count, etc.), the highest priority objects can be fetched first. An example of the use of such a setting would be to prioritize web site static content over files in a media library, as the web site content should fetch quicker and benefit more users. In addition, the control metadata might specify origin retrieval bandwidth or request rate limits, so as to avoid overloading the origin infrastructure during the ingestion process.

A more detailed description of the messages in the sequences shown in FIG. 6 is now provided. Note that some conventional HTTP headers are omitted from the examples below for clarity and brevity.

Scenario 1: Responding to initial end-user request for/ index.html. For this example '/index.html' is not present in the configured origin, which is network storage 604, which is reachable at hostname: 'example.download.cdn.com'. Therefore, that object is pulled from the content provider origin server 606 reachable at hostname 'origin-www.example.com' using a fail-over configuration:

Step 610—HTTP Request from End User to CDN server (602) with IP address 1.2.3.4
GET/index.html
Host: www.example.com
Cookie: user=JohnDoe2015

612—Request from CDN server to network storage at 'example.download.cdn.com':
GET/12345/index.html
Host: example.download.cdn.com
Cookie: user=JohnDoe2015

614—Network storage does not have the object so it returns a 404 to the CDN server:
HTTP/1.1 404 Not Found

616—The CDN control metadata configuration specifies a match condition for a 404 response code that triggers a fail-over request to the content provider's origin server at 'origin-www.example.com':
GET/index.html
Host: origin-www.example.com
Cookie: user=JohnDoe2015

618—The origin server 'origin-www.example.com' returns the object to the CDN server at 1.2.3.4:
HTTP/1.1 200 OK
<HTML> . . .

620—The CDN server at 1.2.3.4 returns the content to the end user client; response:
HTTP/1.1 200 OK
<HTML> . . .

After returning the object to the end user, the CDN server 602 generates and sends a request, preferably asynchronously, to network storage which causes network storage to pull the URL from the origin server and store it:

622—Request From CDN server 1.2.3.4 to network storage 'example.download.akamai.com' instructing it to pull the content from a given origin server and save it locally on directory/12345. Note that the cookie is stripped from this request.

GET/wget-api?origin=origin-www.example.com&hostname=origin-www.example.com&url=findex.html&localpath=/12345

624—Response from network storage 'example.download.akamai.com' indicating the API WGET requests has been accepted and will be started asynchronously: HTTP/1.1 200 OK 626—Asynchronous request from network storage example.download.akamai.com to origin-www.example.com:

GET/index.html
Host: origin-www.example.com

628—The origin server origin-www.example.com returns the object to network storage which saves it locally on directory/12345:

HTTP/1.1 200 OK
<HTML> . . .

The teachings hereof are not limited to the process of on-boarding a content provider onto the CDN. For example, an existing content provider customer may add new content to its website and have it automatically populated using the mechanisms described herein. Further, an existing content provider customer can update objects on the network storage system by changing the object on its origin server 306, then purge the object from the network storage system (e.g., via an purge HTTP purge API to the network storage system provided for CDN customers). The mechanisms described herein then would operate to automatically load the new version of the object into the network storage system.

Furthermore, in alternate embodiments, the CDN server 302 in FIG. 3 might perform a different failover (that is, different than retrieving the object form origin and serving to client device in steps 4-6). For example, the server might retrieve the object from another source such as another CDN platform; or return an error, or return alternate content, or return a redirect to origin or another source or to alternate content. In any of these cases, which modify steps 4-6, the CDN server 302 can nevertheless still trigger the auto-upload procedure into the network storage system in steps 7a, 7b and those following.

In yet another embodiment, referring to FIG. 3, the CDN server 302 may combine the message of step 7a with that of step 2. In other words, the CDN server may send a forward request for the object in step 2 with a conditional instruction (e.g., in a X-header) telling the network storage 304 that, should the object not be found, the network storage 304 should add the object to the queued to be fetched with the fetching service via steps 8-9. This approach obviates the need for the CDN server 302 to send the separate request in 7a. The CDN server would include, typically, the URL and origin from which to conditionally fetch the object in the request at step 2.

Note that in some cases, the URL used in step 2 may differ from that used to fetch from origin. The CDN server 30 may provide the origin-URL in step 7a. Alternatively, still referring to FIG. 3, in some embodiments, the CDN server 302 provides a URL to the storage system in the forward request (e.g. in step 2), and network storage 304 knows to translate or map this request to a different URL used for origin-fetch, according to an internal configuration/logic resident at network storage 304. This relieves the CDN server 302 from having to provide this version of the URL to the network storage 304 at step 2 or at step 7a.

Computer Based Implementation

The subject matter described herein may be implemented with computer systems, as modified by the teachings hereof, with the processes and functional characteristics described herein realized in special-purpose hardware, general-purpose hardware configured by software stored therein for special purposes, or a combination thereof, as modified by the teachings hereof to improve the functioning of distributed computing systems.

Software may include one or several discrete programs. A given function may comprise part of any given module, process, execution thread, or other such programming construct. Generalizing, each function described above may be implemented as computer code, namely, as a set of computer instructions, executable in one or more microprocessors to provide a special purpose machine. The code may be executed using conventional apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 7:
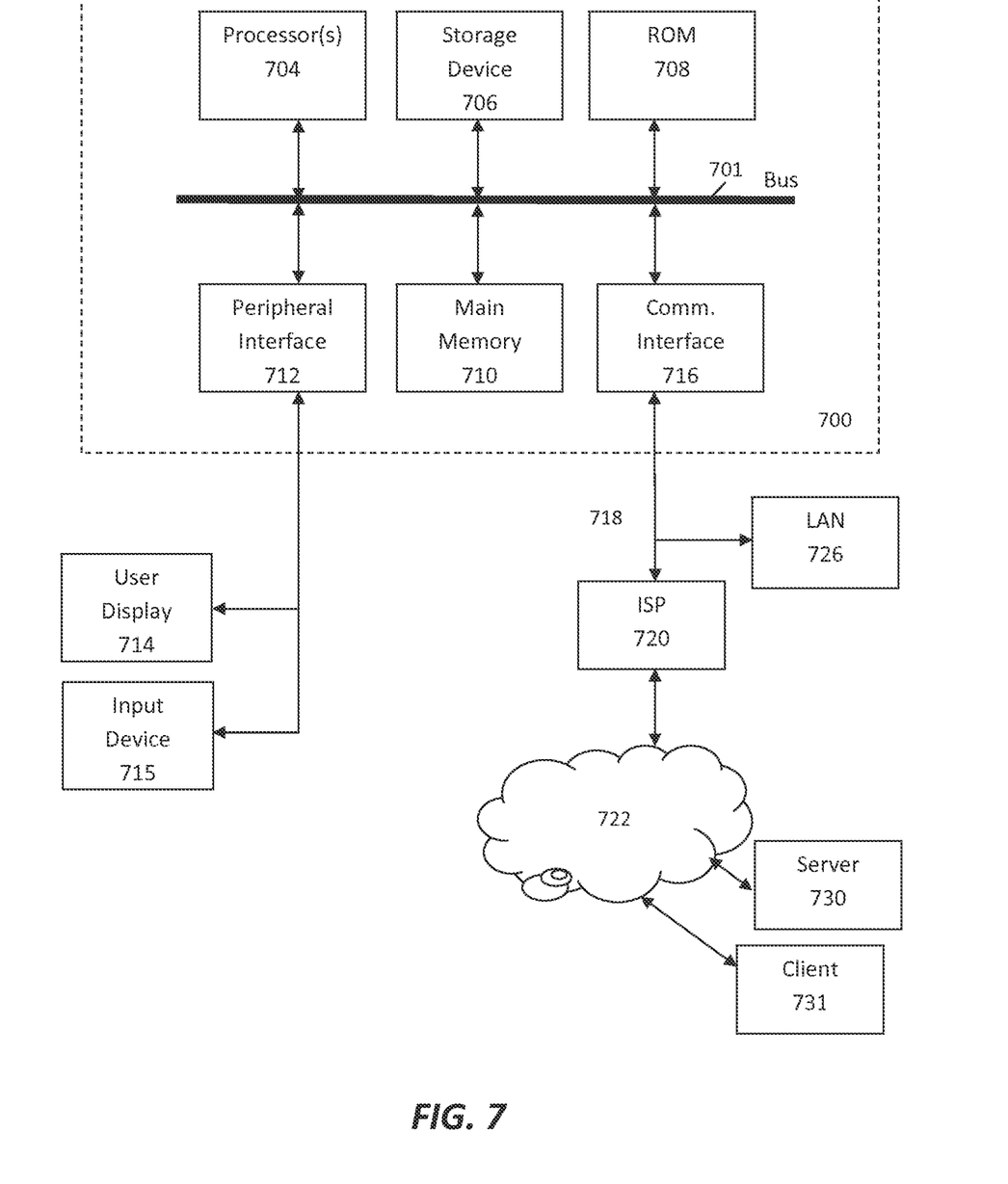

FIG. 7 is a block diagram that illustrates hardware in a computer system 700 on which embodiments of the invention may be implemented. The computer system 700 may be embodied in a client device, server, personal computer, workstation, tablet computer, wireless device, mobile device, network device, router, hub, gateway, or other device.

Computer system 700 includes a microprocessor 704 coupled to bus 701. In some systems, multiple microprocessor and/or microprocessor cores may be employed. Computer system 700 further includes a main memory 710, such as a random access memory (RAM) or other storage device, coupled to the bus 701 for storing information and instructions to be executed by microprocessor 704. A read only memory (ROM) 708 is coupled to the bus 701 for storing information and instructions for microprocessor 704. As another form of memory, a non-volatile storage device 706, such as a magnetic disk, solid state memory (e.g., flash memory), or optical disk, is provided and coupled to bus 701 for storing information and instructions. Other application-specific integrated circuits (ASICs), field programmable gate arrays (FPGAs) or circuitry may be included in the computer system 700 to perform functions described herein.

Although the computer system 700 is often managed remotely via a communication interface 716, for local administration purposes the system 700 may have a peripheral interface 712 communicatively couples computer system 700 to a user display 714 that displays the output of software executing on the computer system, and an input device 715 (e.g., a keyboard, mouse, trackpad, touchscreen) that communicates user input and instructions to the computer system 700. The peripheral interface 712 may include interface circuitry and logic for local buses such as Universal Serial Bus (USB) or other communication links.

Computer system 700 is coupled to a communication interface 716 that provides a link between the system bus 701 and an external communication link. The communication interface 716 provides a network link 718. The communication interface 716 may represent an Ethernet or other network interface card (NIC), a wireless interface, modem, an optical interface, or other kind of input/output interface.

Network link 718 provides data communication through one or more networks to other devices. Such devices include other computer systems that are part of a local area network (LAN) 726. Furthermore, the network link 718 provides a link, via an internet service provider (ISP) 720, to the Internet 722. In turn, the Internet 722 may provide a link to other computing systems such as a remote server 730 and/or a remote client 731.

In operation, the computer system 700 may implement the functionality described herein as a result of the microprocessor executing program code. Such code may be read from or stored on memory 710, ROM 708, or non-volatile storage device 706, which may be implemented in the form of disks, tapes, magnetic media, solid state devices, CD-ROMs, optical media, RAM, PROM, EPROM, and EEPROM. Any other non-transitory computer-readable medium may be employed. Executing code may also be read from network link 718 (e.g., following storage in an interface buffer, local memory, or other circuitry).

A client device may be a conventional desktop, laptop or other Internet-accessible machine running a web browser or other rendering engine, but as mentioned above a client may also be a mobile device. Any wireless client device may be utilized, e.g., a cellphone, pager, a personal digital assistant (PDA, e.g., with GPRS NIC), a mobile computer with a smartphone client, tablet or the like. Other mobile devices in which the technique may be practiced include any access protocol-enabled device (e.g., iOS™-based device, an Android™-based device, other mobile-OS based device, or the like) that is capable of sending and receiving data in a wireless manner using a wireless protocol. Typical wireless protocols include: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP. The WAP (wireless access protocol) also provides a set of network communication layers (e.g., WDP, WTLS, WTP) and corresponding functionality used with GSM and CDMA wireless networks, among others.

In a representative embodiment, a mobile device is a cellular telephone that operates over GPRS (General Packet Radio Service), which is a data technology for GSM networks. Generalizing, a mobile device as used herein is a 3G- (or next generation) compliant device that includes a subscriber identity module (SIM), which is a smart card that carries subscriber-specific information, mobile equipment (e.g., radio and associated signal processing devices), a man-machine interface (MMI), and one or more interfaces to external devices (e.g., computers, PDAs, and the like). The techniques disclosed herein are not limited for use with a mobile device that uses a particular access protocol. The mobile device typically also has support for wireless local area network (WLAN) technologies, such as Wi-Fi. WLAN is based on IEEE 802.11 standards. The teachings disclosed herein are not limited to any particular mode or application layer for mobile device communications.

It should be understood that the foregoing has presented certain embodiments of the invention that should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that trademarks appearing herein are the property of their respective owners and used for identification and descriptive purposes only, given the nature of the subject matter at issue, and not to imply endorsement or affiliation in any way.

The invention claimed is:

1. A method for migrating objects to a distributed computing system that comprises a content delivery network (CDN), the CDN having a plurality of proxy servers deployed across one or more computer networks for delivering content of one or more content providers to end-user clients and having a network storage, the method comprising:

executing a process to any of (i) integrate a web site with a content delivery network (CDN) and (ii) update or add to the website previously integrated with the CDN, the process comprising migrating a plurality of objects, which are for the website, from an origin server associated with a particular content provider customer of the CDN to a network storage associated with the CDN, from which network storage the plurality of objects thereafter will be delivered to end-user clients accessing the website through a plurality of proxy servers of the CDN, wherein each particular object of the plurality of objects is migrated one at a time and upon receiving an end-user client device request for the particular object on the website, said migrating for each particular object comprising, with a given proxy server in the plurality of proxy servers in the CDN:

receiving a first request for a particular object from an end-user client device;

sending a second request for the particular object to the network storage, the network storage comprising a set of one or more servers;

receiving a first response from the network storage, the first response indicating that the particular object was not found in the network storage;

sending a second response to the end-user client device in response to the first request, the second response including the particular object; and triggered by receiving the first response, generating and sending a message to the network storage, the message including information that causes the network storage to retrieve the particular object from the origin server and store the particular object in the network storage.

2. The method of claim 1, wherein the message includes a URL for the particular object and identifies the origin server, which is distinct from the network storage, causing the network storage to retrieve the particular object from the origin server and store the particular object in the network storage.

3. The method of claim 1, wherein generating the message is performed asynchronously to the sending of the second response.

4. The method of claim 1, further comprising: retrieving the particular object from the origin server, in order to be able to send the second response with the particular object.

5. The method of claim 1, wherein the network storage is designated as a source of content in a configuration available at the given proxy server.

6. The method of claim 1, wherein the given proxy server consults a configuration associated with the particular content provider customer, the configuration comprising logic that instructs the given proxy server as to whether to generate the message, based at least in part on any of the first request and the second request.

7. The method of claim 1, wherein the given proxy server consults a configuration associated with the particular content provider customer, the configuration comprising logic that instructs the given proxy server how to generate the message from any of the first request and the second request.

8. The method of claim 1, wherein generating the message comprises: removing at least one of the following from any of the first request and the second request: (i) a request header, (ii) a cookie, (iii) a URL parameter.

9. The method of claim 1, wherein the given proxy server determines whether the particular object is a static object, as part of determining whether to generate the message.

10. A distributed computing system that comprises a content delivery network (CDN) with on-demand ingestion of objects, the CDN comprising:
   a plurality of proxy servers deployed in one or more computer networks for delivering content of one or more content providers to end user clients;
   a network storage subsystem comprised of one or more servers;
   the plurality of proxy servers configured to execute a process to any of (i) integrate a website with the CDN and (ii) update or add to the website previously integrated with the CDN, the process comprising migrating a plurality of objects, which are for the website, from an origin server associated with a particular content provider customer of the CDN to the network storage subsystem associated with the CDN, from which network storage subsystem the plurality of objects thereafter will be delivered to end-user clients accessing the website through the plurality of proxy servers of the CDN, wherein each particular object of the plurality of objects is migrated one at a time and upon receiving an end-user client device request for the particular object on the website;
   the plurality of proxy servers including a particular proxy server having at least one microprocessor and memory holding computer program code executable on the at least one microprocessor, including computer program code for migrating for each particular object at last least by:
      receiving a first request for a particular object from an end-user client device;
      sending a second request for the particular object to the network storage subsystem;
      receiving a first response from the network storage subsystem, the first response indicating that the particular object was not found in the network storage subsystem;
      sending a second response to the end-user client device in response to the first request, the second response comprising the particular object; and,
      triggered by receiving the first response, generating and sending a message to the network storage subsystem;
   the one or more servers in the network storage subsystem having at least one microprocessor and memory holding computer program code executable on the at least one microprocessor, including computer program code for:
   receiving the message from the particular proxy server;
   in response to the message, retrieving the particular object from the origin server; and
   storing the particular object in the network storage subsystem.

11. The system of claim 10, wherein the message identifies the origin server, which is distinct from the network storage subsystem, and includes a URL for the particular object, and wherein the one or more servers in the network storage subsystem include code for requesting the particular object from the origin server using the URL and receiving the particular object from the origin server.

12. The system of claim 10, the one or more servers in the network storage subsystem having computer program code in memory for: upon a subsequent request for the particular object from one of the plurality of proxy servers, serving the particular object without checking the time to live (TTL) value of the particular object.

13. The system of claim 10, wherein the particular proxy server has computer program code in memory for generating the message asynchronous to the sending of the second response.

14. The system of claim 10, wherein the particular proxy server has computer program code in memory for retrieving the particular object from the origin server, in order to be able to send the second response with the particular object.

15. The system of claim 10, wherein the network storage subsystem is designated as a content source in a configuration stored in memory at the particular proxy server.

16. The system of claim 10, wherein the particular proxy server has computer program code in memory for consulting a configuration associated with a particular content provider, the configuration comprising logic that instructs the particular proxy server as to whether to generate the message, based at least in part on any of the first request and the second request.

17. The system of claim 10, wherein the particular proxy server has computer program code in memory for consulting a configuration associated with a particular content provider, the configuration comprising logic that instructs the particular proxy server how to generate the message from any of the first request and the second request.

18. The system of claim 10, wherein generating the message comprises: removing at least one of the following from any of the first request and the second request: (i) a request header, (ii) a cookie, (iii) a URL parameter.

19. The system of claim 10, wherein the particular proxy server has computer program code in memory for determining whether the particular object is a static object, as part of determining whether to generate the message.

* * * * *